United States Patent Office 3,549,476
Patented Dec. 22, 1970

3,549,476
LAMINATED SAFETY PANES
Karl Dietzel, Krefeld-Uerdingen, Günter Peilstöcker, Krefeld-Bockum, and Hans-Peter Siemonsen, Aachen, Germany, assignors to Farbenfabriken Bayer Aktiengesellschaft, Leverkusen, Germany, a corporation of Germany, and Compagnie de Saint-Gobain, Neuilly-sur-Seine, France, a corporation of France
No Drawing. Filed Dec. 12, 1966, Ser. No. 600,750
Int. Cl. B32b 17/10, 27/30
U.S. Cl. 161—165         4 Claims

ABSTRACT OF THE DISCLOSURE

A relatively thick glass plate having a comparatively thin polycarbonate foil bonded thereto and the utility thereof as safety panes.

---

The commercially avialable laminated safety panes consist of two glass plates of about 2 to 4 mm., preferably about 3 mm. thickness, which are cemented with one another with a layer of an elastic adhesive of a thickness of about 0.05 to 1.0 mm., preferably about 0.1 to 0.5 mm., which is, as a rule, plasticizer-containing polyvinyl butyral.

These laminated panes generally withstand, at room temperature, blows of an energy of up to about 1.5 mkp. When subjected to stronger stresses, they are pierced. In such a case it is the advantage of these panes that the bulk of the glass splinters thereby occurring does not fly, but is held by the adhesive layer, and the rest drops down without force. If, however, the piercing is brought about by a part of the human body, e.g. the head, for example through a windshield of a car, then there is nevertheless a risk for this part of the body to receive heavy cut injuries due to the formation of the so-called "neck-ruff."

There have already been proposed safety panes which consist of a plate of at least about 2 mm. thickness made from high molecular weight, linear bisphenol polycarbonate, these plates themselves being provided with scratch-resistant surface layers. By one methd of producing these safety panes, the one scratch-resistant surface layer consists of a preferably at most about 1.5 mm. thick glass plate combined with the polycarbonate plate by an about 0.1 mm. thick adhesive layer, whereas the other surface may be provided with a layer deposited by evaporation consisting of $SiO_x$, $x$ having a value of between 1 and 2. The polycarbonate plate of these safety panes constitutes the preponderant part of the total material, since the glass plate only serves to give a scratch-resistant surface to the polycarbonate plate. The other properties of these safety panes are therefore almost exclusively determined by the properties of the polycarbonate plate.

Consequently, the most important advantage of these safety panes consists in that they are not pierced even by violent blows, due to the high impact strength of the polycarbonate plate itself; at the most, the glass cover plate cracks, but practically no glass splinters are in this case chipped off since they adhere to the adhesive layer. The feared "neck-ruff" can not occur.

Another advantage of these panes is afforded by the favourable absorption behaviour of the polycarbonates towards light rays so that almost no losses occur in the visible specrum, whereas the generally undesired ultraviolet and infra-red rays are almost completely absorbed. There may also be mentioned the better heat isolation compared with those panes which consist entirely of glass, this isolation essentially being the cause of these panes becoming less readily misted up at varying temperatures than glass panes.

As far as these safety panes consist of a clear-transparent polycarbonate and a clear-transparent glass plate and the adhesive layer is also so chosen that it is clear-transparent, these panes can be used, for example, in the manufacture of power-propelled vehicles, in particular for motor vehicles and railway vehicles. However, they are less suitable to be used as windshields since, when the head of a passenger, for example, should hit the windshield, a repercussion might occur which would lead to a serious concussion of the brain ("pendulum trauma") or even to a fracture of the neck vertebrae.

The object of the present invention comprises laminated safety panes which are characterised in that they consist, in contradistinction to the fundamental idea of the aforementioned known safety panes, of a thicker glass plate on to which a comparatively thin polycarbonate foil is stuck, i.e. they consist of a clear-transparent glass plate which has a thickness of about 2.5 to 7 mm., preferably about 2.8 to about 3.5 mm., and which may be curved, coloured and pre-stressed, preferably ground and polished on both sides, and on to which a clear-transparent, optionally coloured foil having a thickness of about 0.5 to at most about 2 mm., preferably about 0.7 to about 1.5 mm., of high molecular weight polycarbonate of bivalent phenols is slidably applied by means of a clear-transparent adhesive layer of a thickness of about 0.05 mm. to about 1.0 mm., and the other surface of the foil is optionally also provided with an evaporation-deposited layer of $SiO_x$, $x$ having a value of between 1 and 2.

It has been found that the usefulness of such safety panes is greater for many purposes of application, in particular for glazing vehicle windows, e.g. as windshields of motor vehicles, than that of the afore-mentioned known safety panes, and this for several reasons.

In comparison with the previously known panes which consist of two glass plates which have approximately the same thickness and are cemented with one another, these new panes are distinguished by a smaller bulk per unit area since the thickness of the polycarbonate plate constitutes only a fraction of that of the glass plate and the specific weight of the polycarbonate is, moreover, substantially lower than that of the glass. This not only means a saving in weight, but it is also of importance for the use of the laminated panes, e.g. as windshields in motorcars, because, according to recent medical knowledge of accidents, for example, the risk of dangerous head injuries strongly rises with the increase of bulk per unit area of the pane against which the collision occurs.

On the other hand, in spite of the relatively small thickness of the polycarbonate foil, a safety pane of this type surprisingly withstands all shock loads occurring in practice to such panes, as satisfactorily as the safety panes which essentially consist of a thicker polycarbonate plate, i.e. they also are not pierced. If the impact is sufficiently strong to break the comparatively thick glass plate, then the remaining impact energy can also be completely resisted by the thin polycarbonate foil, in this case however not by resilience but, surprisingly, by the fact that the foil becomes deformed at the point of the impact load, due to a stretching process which destroys the energy, although the polycarbonates can normally be stretched only with difficulty or to a limited extent below the transition temperature. It is possible that the impact energy, occurring within a narrow space, results in a sufficient local rise in temperature of the polycarbonate so that the transition temperature is exceeded at this point and the foil, as mentioned above, becomes deformed, while stretching takes place.

If the glass plate and/or the polycarbonate plate would be too thin, then the whole energy would not be consumed by the breaking of the glass plate and the deformation of the polycarbonate plate, the pane could be pierced and thus behave in a similar manner as the known laminated panes. If the glass plate would be too thick, then it would not crack and the aforementioned resilience would occur. If, on the other hand, the polycarbonate plate would be too thick, then it would not be deformed and thus resilience would again occur.

Thus, according to the invention, the thickness of the glass plate and the thickness of the polycarbonate plate are so chosen that the laminated pane produced therefrom by cementing withstands fairly insignificant blows without change, but that it destroys higher impact energies, thus excluding the risk of cut injuries and the "pendulum trauma." Within the limits of thickness according to the invention, the impact limit up to which the pane remains undamaged, can be adjusted, as desired, to a certain extent, depending upon the choice of a thinner or thicker glass and/or polycarbonate plate. In most cases, it is advantageous to combine a thinner glass plate with a thicker polycarbonate plate or vice versa, or to use both plates of a medium thickness.

It is to be emphasised that the afore-mentioned permanent deformation of the polycarbonate plate is conditioned by the special property of the polycarbonates themselves, i.e. that they are very rigid, on the one hand, below the transition temperature which is throughout very high and lies at about 140° C. e.g. in the case of a polycarbonate from bisphenol A (2,2-bis-[phenylol]-propane), that they do not exhibit a cold flow and are therefore not capable of having a permanent plastic deformation in the true sense of the term, otherwise the plates would not have a permanent consistency, but are, on the other hand, stretchable under certain conditions. Thus, in this case, the permanent deformation is the consequence of a stretching process absorbing substantial energies.

Furthermore, the capacity of the polycarbonate to absorb ultra-violet and infra-red rays is so great that even a thin foil still suffices to bar these rays almost completely by the safety panes. In respect to the optical properties, there is added the fact that the glass plates having a thickness of about 2.5 mm. and, in particular, of 2.8 mm. onwards, can be ground and polished on both sides in contradistinction to the thinner glass plates, so that it is preferable to use such so-called plate-glass sheets. The new safety panes, therefore, meet to a far greater extent the very high requirements which are demanded for the optical quality, especially of windshields in motor vehicles, which are generally made in a curved form (compare, for example, "Verkehrsblatt," Amtsblatt des Bundesministers fuer Verkehr der Bundesrepublik Deutschland, 19th vol., 1965, No. 3, pages 61–116, especially page 89, para. B, 25(2)1c and page 91, left column, 3.

Last, but not least, it should be mentioned that the production of larger, especially curved, panes by applying a thin, resilient polycarbonate foil on to a thicker, possibly pre-curved glass plate is, from a technical point of view, also substantially easier to carry out than to combine a thicker polycarbonate plate, which has already become almost rigid, with a likewise almost rigid glass plate, even if it is thinner.

The combination of these properties cannot be found in any other, previously known synthetic material. Finally, it may be mentioned that also the comparatively low thermal conductivity of the polycarbonates has a favourable effect in that the tendency of becoming misted up at varying temperatures is thereby substantially reduced. For this reason, the aforementioned polycarbonates in particular, in combination with glass, are so eminently well suited for the use of laminated safety panes.

High-molecular weight thermoplastic polycarbonates of bivalent phenols, especially bisphenylol alkanes, and processes for their production are well known in the art and described, e.g., in U.S. Pat. Nos. 2,997,459, 3,136,741, 3,028,365, 3,275,601. Especially suitable for the purpose of the present invention are polycarbonates having molecular weights between about 20,000 and 200,000, particularly those which are produced from bis-(4-hydroxyphenyl)-dimethylmethane. If desired the polycarbonate may contain a stabilizer against ultraviolet rays produced, e.g. according to the U.S. patent application Ser. No. 410,704, filed Nov. 12, 1964, now Pat. 3,322,719 or other suitable additives. From these polycarbonates the approximately 0.5 to 2 mm. thick plates can be cast in known manner from the melt through slot dies. In order to impart to these plates almost completely plane-parallel surfaces and thus optical isometry, it is generally expedient to subject them, also in known manner, to an after-treatment in a platen press or in a calender.

Before being laminated with the glass plate the polycarbonate foil may be provided as mentioned above on one surface with a vapour-deposited, clear-transparent layer of $SiO_x$, $x$ having a value of between 1 and 2. A particularly useful process therefore is described in French Pat. 1,520,125.

Suitable adhesives which can also be used for the aforementioned known safety panes are the following, for example, silicone rubber and hardenable polyester/styrene mixtures, preferably those in which the mixing ratio of polyester:styrene is at least about 4:1, as well as plasticized epoxide resins, furthermore the poly-vinyl-butyral foils known from the production of laminated safety panes, and the like. The known, more or less plasticized poly-acrylate adhesives have been found to be especially advantageous for the use as adhesives, since they possess, even in comparatively thick layers, a special optical transparency, an excellent adhesion to glass and polycarbonate and a cohesion suitable for slideable cementing, which is sufficiently retained even up to temperatures to about −30° C. Particularly suitable as adhesive layers for the production of the laminated safety panes according to the invention are foils of a copolymer from 65 percent by weight of 2-ethyl-hexyl acrylate and 35 percent by weight of methyl methacrylate and a copolymer from 65 percent by weight of butyl acrylate and 35 percent by weight of methyl acrylate, these copolymers having a relative viscosity between about 1.5 and about 2.0, measured in a solution of 0.5 gram of substance in 100 ml. benzene at 20° C.

Cementing of the two panes is carried out in the manner known for the production of laminated panes.

The new laminated safety panes can be used everywhere where it is desired that the panes are not pierced even by violent blows and where the risk of cut inpuries is to be excluded. On account of the special properties of the new panes described above in greater detail, they are intended to be used as safety panes in vehicles of any kind, especially as windscreens in road vehicles, the panes being so installed that the glass plate is in an outward position and the polycarbonate plate in an inward position.

The following examples are given for the purpose of illustrating the invention.

EXAMPLE 1

Onto a 30 x 30 cm. large and 3.0 mm. thick plate-glass plate, there is placed a 30 x 30 cm. large and 0.5 mm. thick foil of a copolymer from 65 percent by weight of 2-ethyl-hexyl acrylate and 35 percent by weight of methyl methacrylate of a relative viscosity 1.815, measured in a solution of 0.5 g. of substance in 100 ml. benzene at 20° C. A 30 x 30 cm. large and 1.0 mm. thick plate of bisphenol-A-polycarbonate of a relative viscosity 1.815, measured in a 0.5 percent methylene chloride solution at 25° C., onto one side of which a $3.5\mu$ thick quartz layer is deposited by evaporation, is then applied with the non-coated side. In order to avoid a shifting of the three layers in opposite directions to one another, during the subsequent operation, the laminate is held together by means of clamps. It is then heated to 130° C. in an autoclave under a pressure of 100 mm. Hg and then slowly cooled to room temperature in the course of 60 minutes, while simultaneously increasing the pressure to atmospheric pressure. A clear-transparent laminated pane is obtained.

EXAMPLE 2

The procedure is the same as that described in Example 1, but a 5 mm. thick plate of pre-stressed plate-glass is used.

EXAMPLE 3

The procedure is the same as that described in Example 1, but there is used an adhesive foil of the same size of a copolymer obtained from 65 percent by weight of butyl acrylate and 35 percent by weight of methyl methacrylate of a relative viscosity 1.75.

We claim:
1. A laminated safety pane consisting essentially of a clear, transparent glass plate of a thickness of about 2.5 to about 7 mm. having a clear, transparent foil of a high molecular weight polycarbonate of a bivalent phenol of a thickness of about 0.5 to a maximum of about 2 mm. adhered thereto with an interposed clear, transparent adhesive layer of a thickness of about 0.05 to about 1 mm., said adhesive layer being a copolymer of 65% by weight of 2-ethyl-hexyl acrylate or butyl acrylate and 35% by weight of methyl methacrylate.
2. The laminated safety pane of claim 1 wherein the glass plate is of a thickness of about 2.8 to about 3.5 mm.
3. The laminated safety pane of claim 1 wherein the thickness of the polycarbonate foil is about 0.7 to about 1.5 mm.
4. The laminated safety pane of claim 1 wherein the surface of the polycarbonate foil opposite to the adhered surface thereof is provided with a vapor deposited, clear, transparent layer of $SiO_x$, $x$ having a value of between 1 and 2.

References Cited

UNITED STATES PATENTS

| | | | |
|---|---|---|---|
| 2,999,845 | 9/1961 | Goldberg | 260—47 |
| 3,026,232 | 3/1962 | Finch | 156—212 |
| 3,356,522 | 12/1967 | Libbert | 117—106 |
| 3,406,086 | 10/1968 | Foster | 161—183 |

OTHER REFERENCES

Skeist, Handbook of Adhesives, Reinhold, New York (1962) pp. 409–414, and 486.

JOHN T. GOOLKASIAN, Primary Examiner

W. E. HOAG, Assistant Examiner

U.S. Cl. X.R.

117—126, 161; 156—327; 161—183, 204, 208, 231, 247